UNITED STATES PATENT OFFICE.

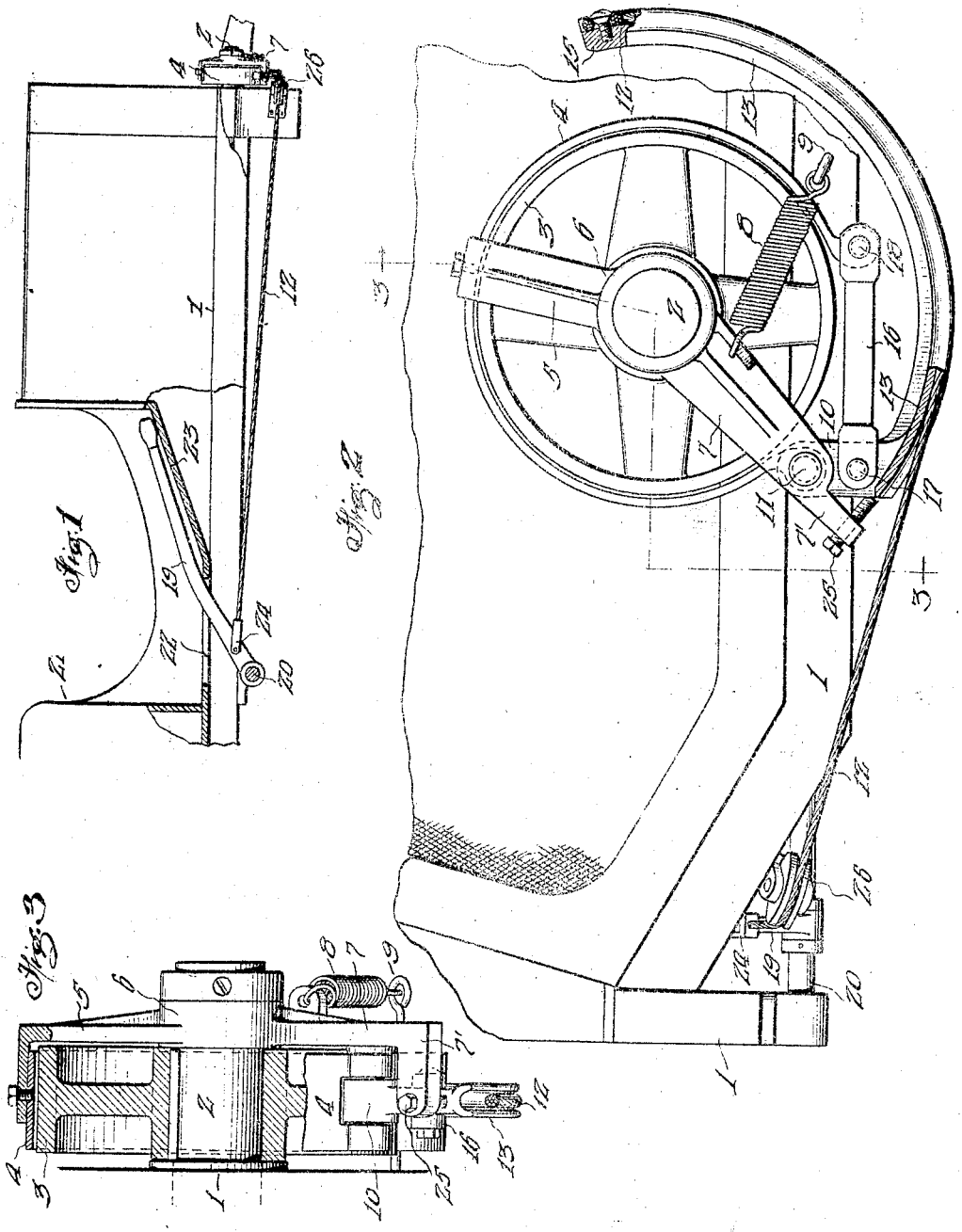

GEORGE WILLIAM SAGE, OF SAN DIEGO, CALIFORNIA, ASSIGNOR OF ONE-THIRD TO W. R. BYARS, OF SAN DIEGO, CALIFORNIA.

GAS-ENGINE-STARTING DEVICE.

1,006,683.

Specification of Letters Patent.   Patented Oct. 24, 1911.

Application filed January 12, 1911. Serial No. 602,345.

*To all whom it may concern:*

Be it known that I, GEORGE WILLIAM SAGE, a citizen of the United States, residing at San Diego, in the county of San Diego and State of California, have invented a new and useful Gas-Engine-Starting Device, of which the following is a specification.

The main object of the present invention is to provide a convenient and effective means for starting gas engines, particularly automobile engines, in such manner that there is no liability of injury to the operator on back firing of the engine.

Another object of the invention is to provide a gas engine starter for automobiles in which the starting means will be located conveniently adjacent to the operator's seat.

Other objects of the invention will appear hereinafter.

The accompanying drawings illustrate the invention, and referring thereto:

Figure 1 is a side elevation of a portion of an automobile, showing the operative connections for the starting device. Fig. 2 is a front elevation of a portion of an automobile, showing the starting clutch. Fig. 3 is a transverse section on line $x^3$—$x^3$ in Fig. 2.

1 designates the body of an automobile, and 2 the shaft of the engine or motor thereof, or, generally speaking, a shaft connected to the motor so that it may be used as a starting shaft. On the shaft 2 is mounted a wheel 3 having a smooth periphery, and a clutch member is provided adapted to engage and grip said periphery, said clutch member consisting of a curved band 4 forming a nearly complete ring extending around said wheel and means for moving the ends of said band together to grip the wheel and for moving the band rotatably with respect to the shaft 2 to rotate said shaft. Said band 4 is carried by or connected to an arm 5 extending from the hub 6 rotatably mounted on the shaft 2, said hub 6 also carrying an arm 7, which is connected at one end to a spring 8 and secured at its other end to a fixed part of the machine frame, for example, as indicated at 9. The operating means comprises an arm 10 pivotally connected at 11 to the arm 7 and a flexible connection, such as a rope, cable or chain 12 connected to the arm 10. In order to give the same radius of action and the same rotative effect in all angular positions of the operating arm, the arm 10 is preferably formed with a segmental extension 13 extending around the wheel 3 concentric with the axis thereof and the flexible operating member 12 is secured at 15 to the end portion of said extension and winds thereover. A link or bar 16 is pivoted at 17 to the arm 10 and at 18 to one end of the clutch band 4, the other end of said band being pivotally connected to the arm 7, as by means of the pivot 11 aforesaid, so that when the arm 10 is turned on the pivot 11 by the operating means 12, the link 16 is drawn in such manner as to contract the band 4 and wind it onto the wheel 3. A limiting means, consisting, for example, of a screw 25 in an extension 7' of the arm 7 engages with the arm 10 to limit the operating movement thereof tending to contract the clutch band 4, so that the said clutch band can not be tightened or gripped so tightly on the wheel 3 as to prevent its instantaneous release under the elasticity of the band 4 when the operating means 12 is slacked or allowed to move to normal position. Arm 5 is sufficiently elastic at its outer end to permit of the contractile movement of the band.

The operating means 12 is preferably controlled by a lever 19 connected thereto, pivoted, for example, as shown at 20, on the frame of the machine adjacent to the operator's seat 21, said lever 19 extending through a slot 22 in the foot board 23 of the machine and normally lying in depressed position, as shown in Fig. 1. The flexible operating means 12 is connected to lever 19 by a pivot 24, and the other end of said flexible means 12 being connected to the arm 10, as stated, a guide sheave 26 being provided for this flexible means 12.

The operation is as follows: Normally the lever 19 lies in depressed position, as shown in Fig. 1, and the spring 8 holds the arm 7 and connecting parts in position shown in Fig. 2, in which position the band 4 expands under its own elasticity to a diameter greater than that of the periphery of the wheel 3, so that the clutch constituted by the members 3 and 4 is released. If it is desirable to start the engine shaft, the lever 19 is forcibly lifted, causing the flexible member 12 to turn the arm 10 around the pivot 11. On account of the resistance offered by the spring 8, the first effect of this turning movement is to contract the band 4 onto the periphery of the wheel 3, causing said band to clutch or grip onto the said wheel. Further movement of the arm 10 by the operation of lever 19 through the flexible connecting means 12 causes the band 4 to turn, together with the arm 7, around the axis of the wheel and said band being clutched to the wheel 3, the shaft 2 is thereby forcibly rotated. It will be understood that if the first partial rotation thus effected is insufficient to start the engine, the operation may be repeated, the spring 8 drawing the arm 7 back after each operation. If, during the starting operation, the engine should backfire, the device is returned to its normal position by such action and the clutch is thereby released from engagement with the wheel 3. For this reason and for the reason that the starting lever 19 is not in the form of a rotary crank adapted to swing around and strike the other arm of the operator, but it is a lever having a simple to and fro movement, danger to the operator is avoided.

What I claim is:—

In combination with a shaft of a gas engine, a wheel on said shaft, a friction clutch member adapted to grip said wheel and tending to move into position to release the wheel, an operating arm connected to said member to tighten the clutch member on the wheel and to rotate the clutch member with the wheel, a spring for restoring the arm to normal position, said arm having an extension concentric with the axis of the shaft, a flexible operating means winding on said extension and connected thereto, and a lever connected to said flexible operating means.

In testimony whereof, I have hereunto set my hand at Los Angeles, California, this 5th day of January, 1911.

GEORGE WILLIAM SAGE.

In presence of—
 ARTHUR P. KNIGHT,
 FRANK L. A. GRAHAM.